(12) United States Patent
Jeong

(10) Patent No.: US 7,257,313 B2
(45) Date of Patent: Aug. 14, 2007

(54) METHOD AND APPARATUS FOR REPRODUCING OPTICAL DISK PLAYER HAVING QUICK VIDEO PLAYBACK FUNCTION

(75) Inventor: Jeong-joo Jeong, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1043 days.

(21) Appl. No.: 10/400,917

(22) Filed: Mar. 28, 2003

(65) Prior Publication Data
US 2004/0047601 A1 Mar. 11, 2004

(30) Foreign Application Priority Data
Aug. 23, 2002 (KR) .............................. 2002-50103

(51) Int. Cl.
*H04N 5/91* (2006.01)
(52) U.S. Cl. ..................... 386/68; 386/95; 386/125
(58) Field of Classification Search ............... 386/45, 386/46, 68, 95, 125, 126; 369/30.03; 725/86, 725/109, 91–93, 61, 135
See application file for complete search history.

(56) References Cited

U.S. PATENT DOCUMENTS 5,675,738 A * 10/1997 Suzuki et al. ............... 725/109
6,578,201 B1 * 6/2003 LaRocca et al. ............. 725/86
6,580,872 B1 * 6/2003 Kikuchi et al. ............... 386/95

FOREIGN PATENT DOCUMENTS

| KR | 10-271258  | 11/1996 |
|----|------------|---------|
| KR | 1998-65239 | 10/1998 |

OTHER PUBLICATIONS

Office Action issued Apr. 29, 2005 in Korean Patent Application No. 10-2002-0050103 by the Korean Industrial Property Office.

* cited by examiner

Primary Examiner—James J. Groody
Assistant Examiner—Christopher Onuaku
(74) Attorney, Agent, or Firm—Staas & Halsey LLP

(57) ABSTRACT

A digital video disk player having a quick playback function and a method of reproducing an optical disc using the digital video disk player. The quick playback function is accomplished by analyzing reproduction control information and searching the titles corresponding to a predetermined title, calculating the running time of each title based on the video title information corresponding to the searched titles, and reproducing the selected title on the basis of the calculated running time. Accordingly, a selective reproduction of a title corresponding to a main movie among a plurality of titles recorded on the disk can be performed.

15 Claims, 5 Drawing Sheets

METHOD AND APPARATUS FOR REPRODUCING OPTICAL DISK PLAYER HAVING QUICK VIDEO PLAYBACK FUNCTION

CROSS-REFERENCE TO RELATED APPLICATIONS

This application claims the priority of Korean Patent Application No. 2002-50103, filed on Aug. 23, 2002, in the Korean Intellectual Property Office, the disclosure of which is incorporated herein in its entirety by reference.

BACKGROUND OF THE INVENTION

1. Field of the Invention

The present invention relates to an optical disk player, and more particularly, to a digital video disk player having a quick video playback function and a method of reproducing an optical disc using the digital video disk player.

2. Description of the Related Art

Optical disk players for recording and reproducing video and audio data on semi-permanent optical disks have been developed, in accordance with recent developments of audio and video information media. An optical disk player reproduces videos and/or audios recorded on an optical disk by outputting them via pictures and/or speakers. Besides being randomly accessible, the optical disk player is advantageous in that it is able to reproduce signals with high resolution and high fidelity.

Various types of optical disk players, such as compact disk players (CDPs), laser disk players (LDPs), compact disk graphic players (CDGPs), video compact disk players (VCDPs), and the like have been developed and are widely used. More recently, digital video disks (DVDs) have been developed utilizing motion picture compression technologies of MPEG-2 (motion picture experts group) and DVD players for reproducing them.

The DVDs reproduced by a DVD player typically include a program chain called a first playback program chain (FP_PGC), and the DVD player reproduces such program chain first for the manufacturers' preferences. Since the DVD player necessarily reproduces the FP_PGC, manufacturers usually insert advertisements demanded by disk producers or any other information such as FBI warning messages in that portion.

Mostly, FBI warning messages and feature previews of movie productions are inserted in the program chain recorded on the disk. Since the disks are typically fabricated not to allow users to implement other functions such as stop, fast forward scan (FFS), skip, or the like while the FBI warning messages or feature previews are played, users are forced to watch those portions. Further, the DVD player does not move to a main movie recording area even when the reproduction of the program chain ends, but instead moves to a menu of the disk using a navigation command.

Accordingly, there have been problems in conventional DVD players as the user must watch unwanted advertisements or information at the time of reproduction of a disk, and the user can not start to reproduce a main movie unless a user selects the movie after moving to a menu of the disk.

SUMMARY OF THE INVENTION

To solve the above-described problems, it is an aspect of the present invention to provide a method of reproducing an optical disk, which allows a quick playback of a title corresponding to a main movie among a plurality of titles recorded on the disk.

It is another aspect of the present invention to provide an optical disk player that allows a quick playback of a title corresponding to a main movie among a plurality of titles recorded on a disk.

According to an aspect of the present invention, a method of reproducing an optical disk comprises the operations of (a) searching the titles corresponding to a predetermined title reproduction type by analyzing reproduction control information, (b) calculating the running time of each title based on the video title information corresponding to the titles searched in operation (a), and (c) reproducing the selected title based on the running time calculated in operation (b).

According to another aspect of the present invention, a method of reproducing an optical disk comprises the operations of (a) enabling or disabling a quick playback function using a user setup menu, (b) reading out video manager information from the disk, (c) searching the titles, if the quick playback function is enabled in operation (a), having reproduction types, in the video manager information read out in operation (b), are predetermined as one sequential program chain titles and detecting the video title set information thereof, (d) calculating the running time of each title based on the video title set information detected in operation (c), and (e) comparing the running time of each title in operation (d) and reproducing the title having the longest running time.

According to yet another aspect of the present invention, an optical disk player comprises a recording device that utilizes a recording medium on which video reproduction information and video title information are recorded, the recording device including a system controller that searches the titles, by analyzing the video reproduction information read out of the record medium, reproduction types that are predetermined as one sequential program chain titles (One_Sequential_PGC_Title) and reproducing the title having the longest running time by detecting the running time of each title based on the video title information corresponding to the searched titles.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become more apparent and more readily appreciated by describing, in detail, preferred embodiments thereof with reference to the attached drawings in which.

DETAILED DESCRIPTION OF THE PREFERRED EMBODIMENTS

Figure 1A:
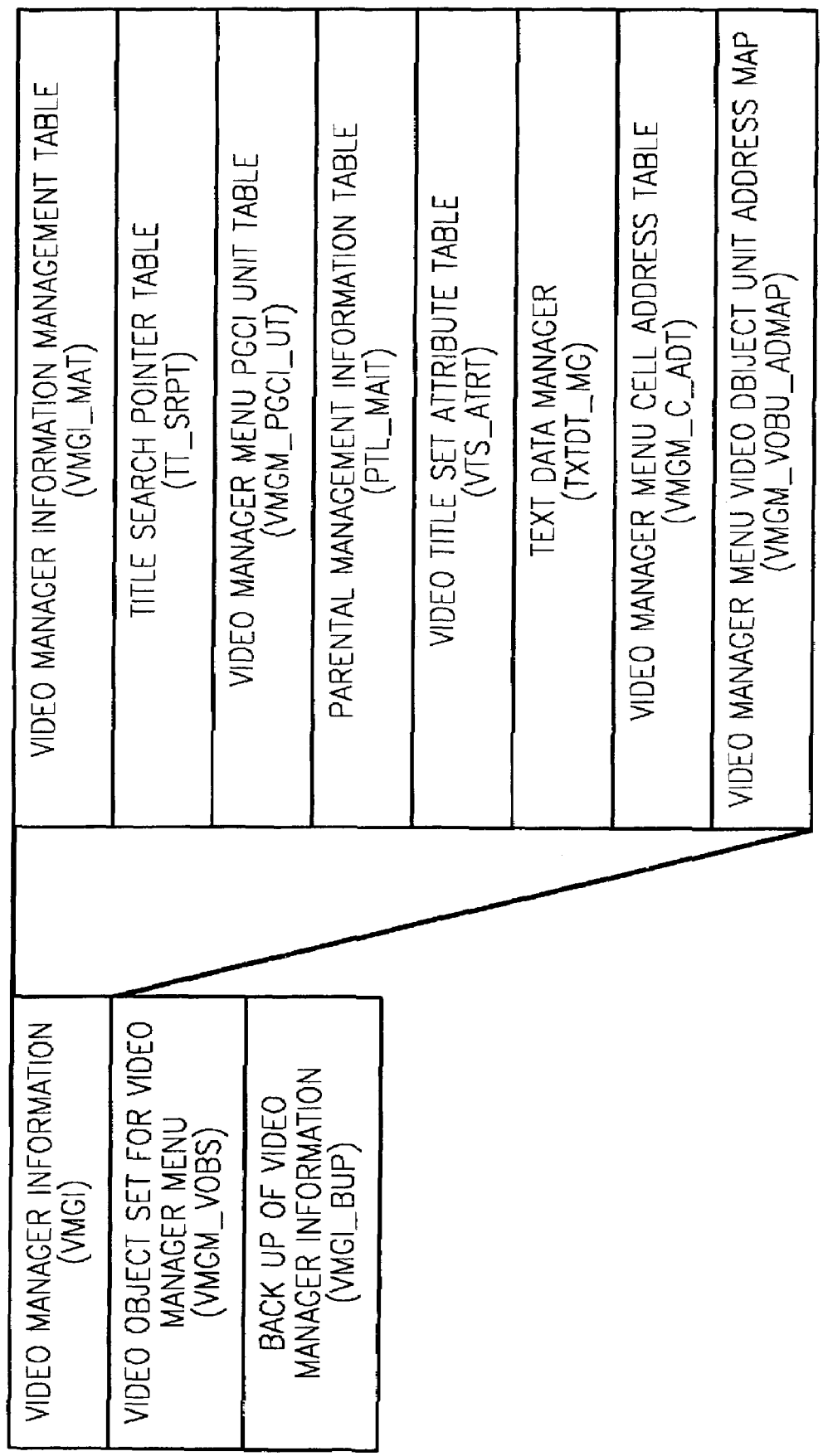
FIGS. 1A and 1B represent a conventional scheme of a video manager file and a video title set, respectively.

Embodiments of the present invention are described in more detail below and are illustrated in the attached drawings. Reference numerals are used to identify elements of the embodiments. The reference numerals in the description correspond to the reference numerals in the drawings, with like reference numerals indicating like elements throughout.

A data recording and reproducing scheme on a digital video disk (DVD) is described below. The innermost track area of a DVD is a lead-in area where control data and information about the outline of the data recorded on the disk are included. The next track area is a volume and file structure area, and the next track area is a video area which includes a video manager (VMG) area and one to ninety-nine video title set (VTS) areas. The outermost track area is a lead-out area.

Referring to FIG. 1A, the VMG area forming a video area includes control data called video manager information (VMGI), a VMGM_VOBS that represents a video object set for video manager menu, and a VMGI_BUP that is a backup of the control data (VMGI_BUP). In this scheme, the VMGI is disk reproduction information recorded on a DVD, which includes information on the existence of a menu, the existence of a first playback program chain (FP_PGC), the number of video titles, and the like. More specifically, the VMGI includes a video manager information management title (VMGI_MAT), a title search pointer table (TT_SRPT), a video manager menu PGCI (program chain information) unit table (VMGM_PGCI_UT), a parental management information table (PTL_MAIT), a video title set attribute table (VTS_ATRT), a text data manager (TXTD_MG), a video manager menu cell address table (VMGM_C_ADT), and a video manager menu video object unit address map (VMGM_VOBU_ADMAP).

Figure 1B:
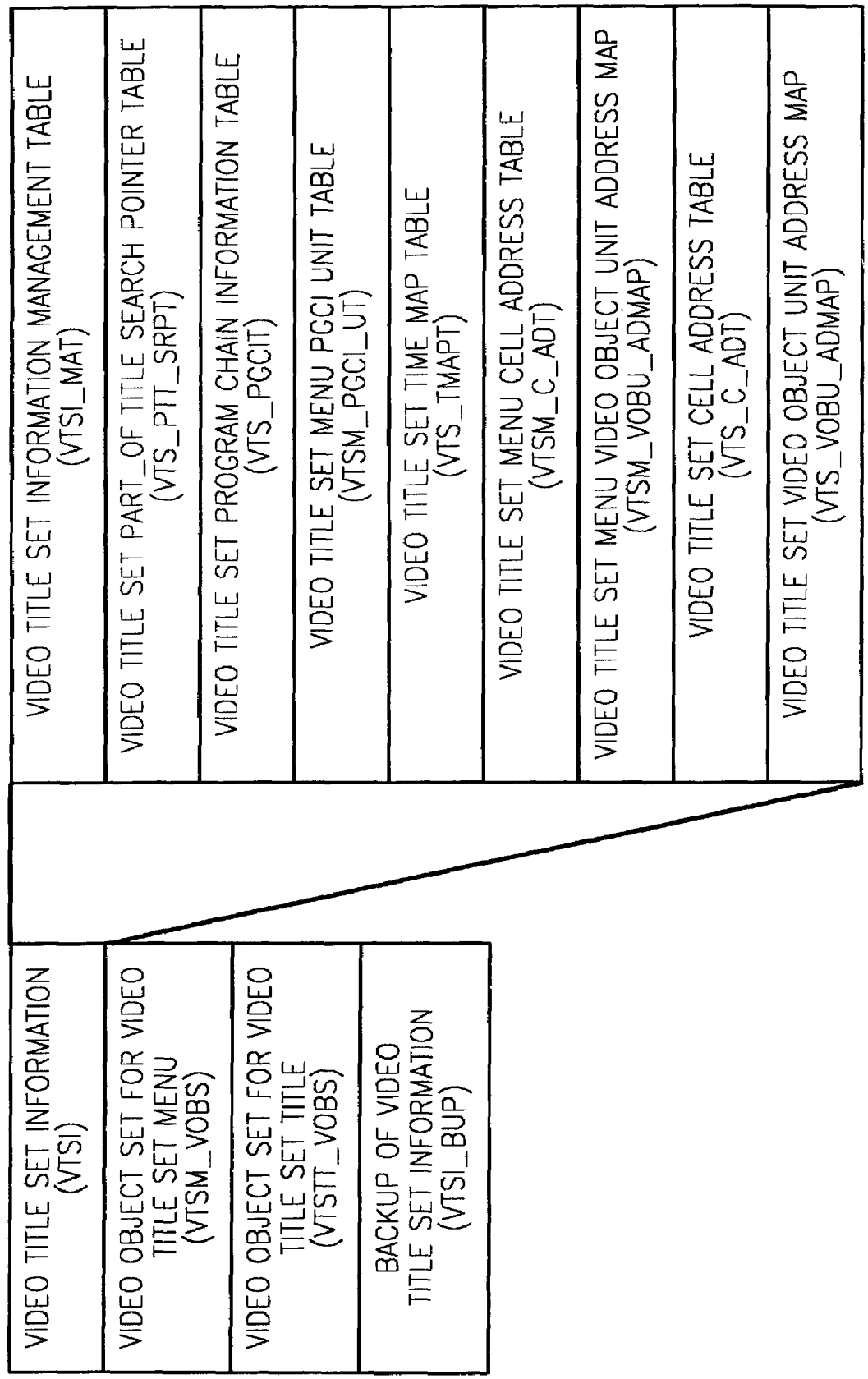

Each VTS area forming a substantial data area is a collection of titles. Referring to FIG. 1B, the VTS area includes control data called a video title set information (VTSI), a video object set for video title set menu (VTSM_VOBS), a video object set for video title set title (VTSTT_VOBS), and a backup of video title set information (VTSI_BUP). In this scheme, the VTSI is specific reproduction information of each title and includes the number and running times of the programs of each title, audios, sub-titles, the number of angles and attribute information related thereto, the disk position of each program, and the like. More specifically, the VTSI includes a video title set information management table (VTSI_MAT), a video title set part of title search pointer table (VTS_PIT_SRPT), a video title set program chain information table (VTS_PGCIT), a video title set menu PGCI unit table (VTSM_PGCI_UT), a video title set time map table (VTS_TMAPT), a video title set cell address table (VTS_C_ADT), a video title set menu cell address table (VTSM_C_ADT), and a video title set video object unit address map (VTS_VOBU_ADMAP).

In the scheme as described above, titles are made up of a program chain (PGC) formed by a cell, or a plurality of PGCs having a predetermined reproduction order. The PGC is made up of reproduction information detected in the program chain information (PGCI). The PGCI includes a plurality of programs and a navigation command. Further, the program is made up of a plurality of cells corresponding to the reproduction units.

Figure 2:
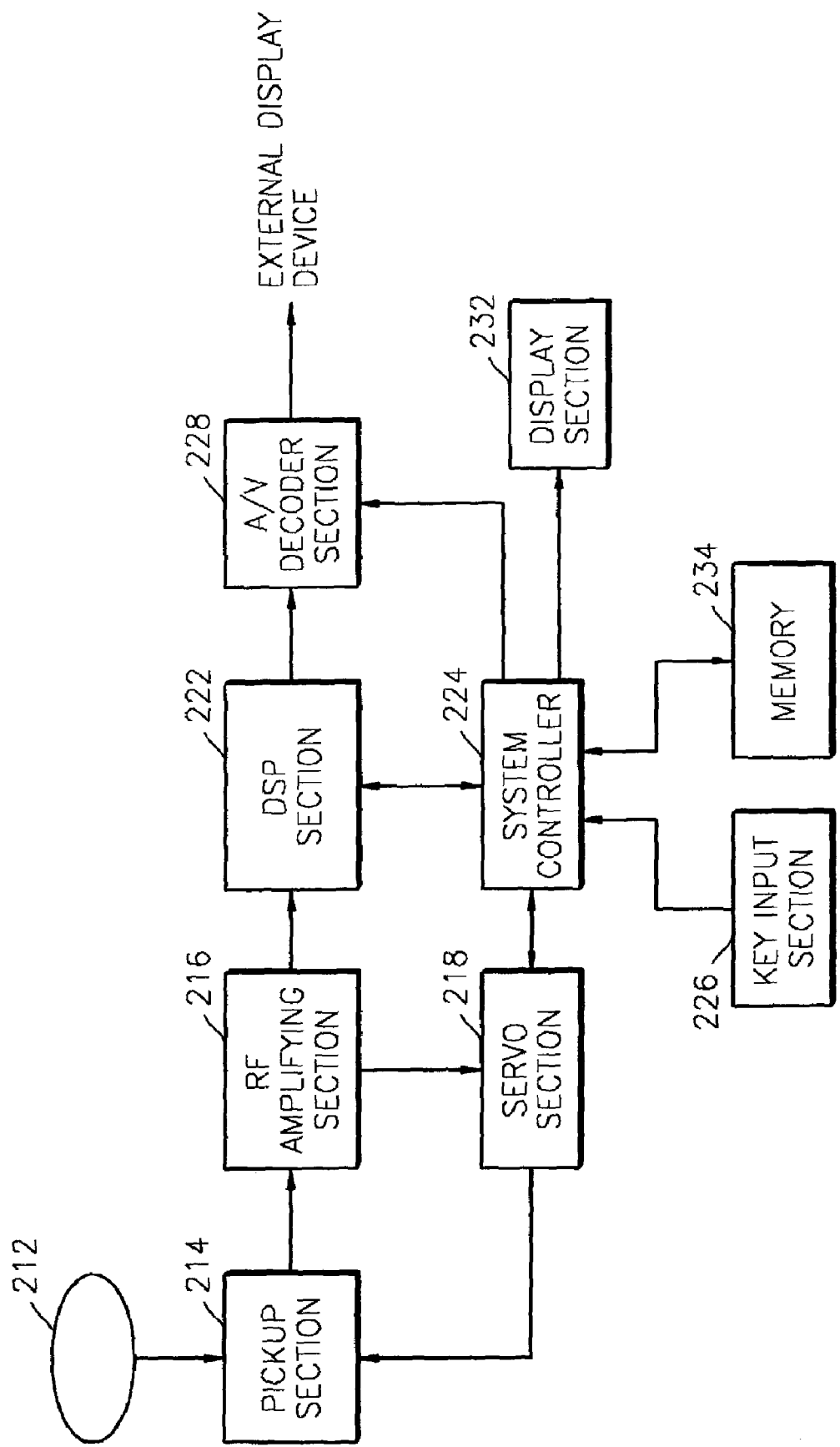
FIG. 2 is a block diagram of an optical disk player having a quick playback function according to an embodiment of the present invention.

FIG. 2 is a block diagram of an optical disk player having a quick playback function according to an embodiment of the present invention. Referring to FIG. 2, a pickup portion 214 reads optical signals from a disk 212 using laser beams. An RF amplifying section 216 converts the optical signals provided from the pickup portion 214 to electrical signals, and extracts modulated data and servo signals. A digital signal processor (DSP) section 222 demodulates the modulated data extracted from the RF amplifying section 216, generates compressed audio and video data, and corrects errors using error correction codes. A servo section 218 receives control data required for servo control from the RF amplifying section 216 and from a system controller 224 to perform stable servo action. An audio/video decoder section 228 decodes the compressed audio and video data from the DSP section 222, and provides video and audio signals to an external display device and speakers (not shown). A display section 232 indicates reproduction information for the interfaces between a user and the player. A memory 234 stores various reproduction control information such as VMGI, VTSI, and the like, that is read out of the disk 212.

The system controller 224 controls the pickup section 214, RF amplifying section 216, DSP section 222, audio/video decoder section 228 and the display section 232 according to an instruction that a user inputs through a key input section 226. The system controller 224 may include computer readable storage, on which the control functions, process and data structures of the present invention can be stored and distributed. The system controller 224 also searches the titles having reproduction types that are predetermined as one sequential program chain title (One_Sequential_PGC_Title) by analyzing the VMGI information read out of the disk 212, calculates the running time of each title based on the information about the detected titles, and reproduces the title having the longest running time after comparing the running time of each title.

Figure 3A:
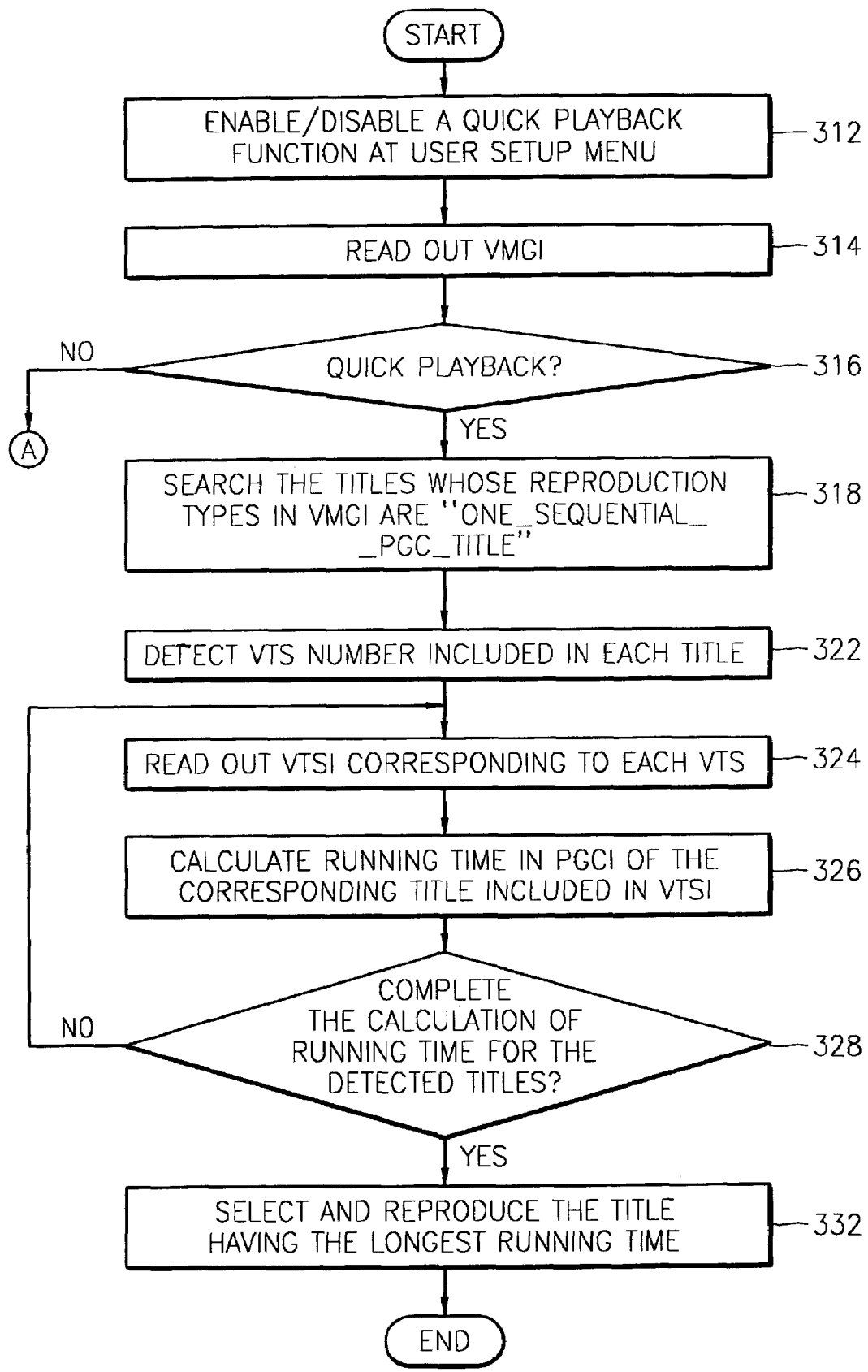
FIGS. 3A and 3B are flowcharts explaining a reproduction method of an optical disk player according to an embodiment of the present invention.
Figure 3B:
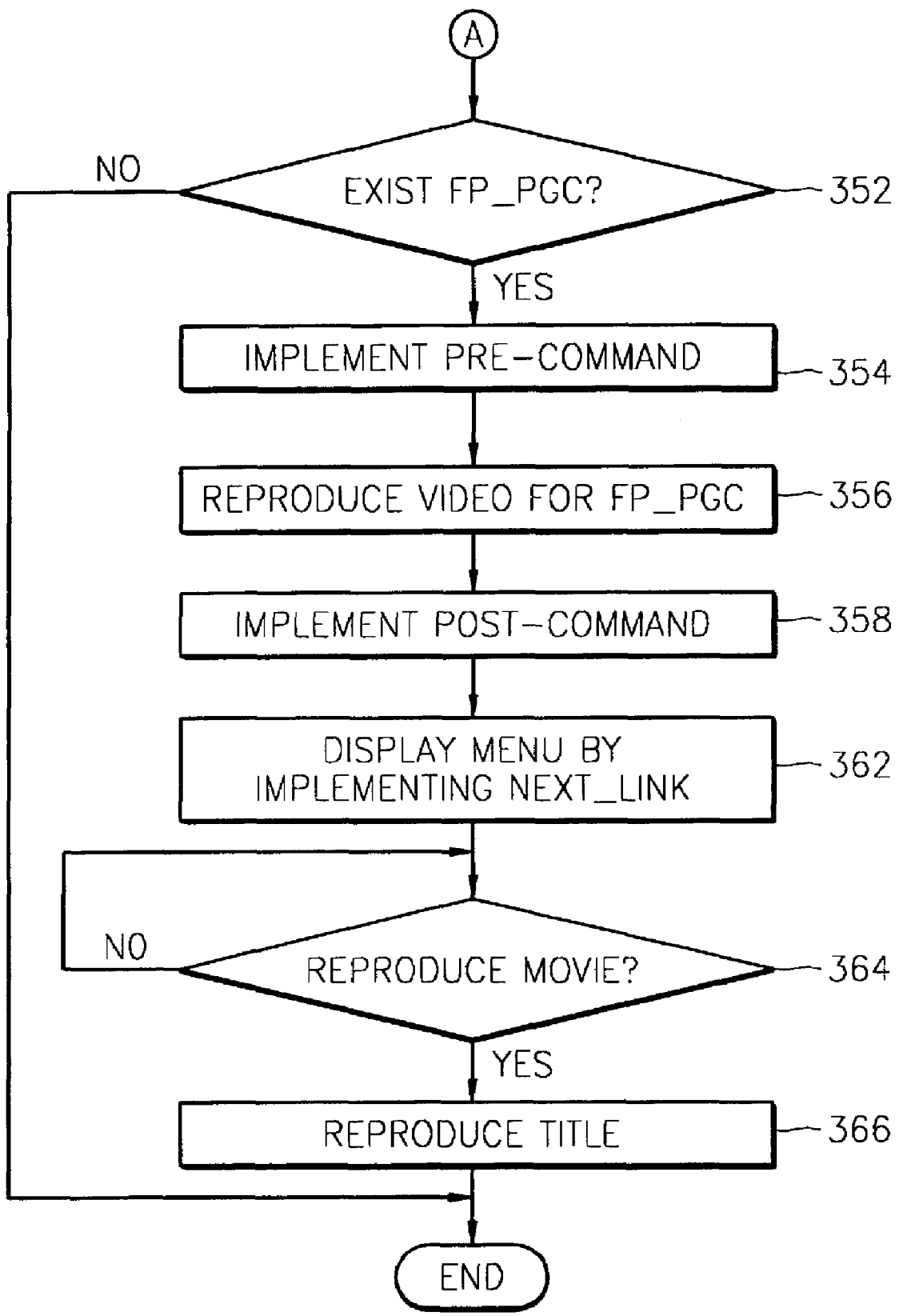

FIGS. 3A and 3B are flowcharts explaining a method of reproducing data from an optical disk player according to an embodiment of the present invention. First, a quick playback function is enabled or disabled via a user setup menu (operation 312). Then, video manager information VMGI is read from the disk that is in a tray of the optical disk player and is stored in the memory (operation 314). If determined that the quick playback function is enabled (operation 316), then reproduction is implemented in a predetermined order to directly reproduce a movie title. That is, the optical disk player searches only those titles predetermined as a sequential program chain title (One_Sequential_PGC_Title) in a title playback type (TT_PB_TY) of a title search pointer (TT_SRP) included in a title search pointer table TT_SRPT (operation 318), and detects, in the VTSN of the title search pointer TT_SRP, the VTS numbers corresponding to the titles (operation 322). The One_Sequential_PGC_Title is the title made up of only one PGC, and has a condition to continuously reproduce programs in that PGC. Thereafter, the VTSI corresponding to the VTS included in each title from the disk is read, and stored in the memory (operation 324). Thereafter, a running time based on the VTS program chain information table (VTS_PGCIT) included in the corresponding title is calculated, and stored in the memory (operation 326). The information on the running time of each title is recorded in VTSNTS_PGCIT/PGC_GI/PGC_PB_TIME. It is then decided whether the running times of all of the searched titles are calculated (operation 328). If the running times of all of the searched titles are calculated, then the running time of each title is compared. The title having the longest running time is regarded as a main movie and is reproduced (operation 332). If the running times of all of the titles are not calculated, the method repeats operations 324 and 326.

If the quick playback function is disabled, VMGI read from the disk is analyzed, and a decision is made concerning whether there is a first playback program chain (FP_PGC) in the disk to be currently reproduced (operation 352). If there is a FP_PGC, reproduction information on the FP_PGC included in the VMGI is reproduced in a predetermined order (operation 354). That is, operation 354 is a pre-command of the FP_PGC, which is a navigation command executed before the FP_PGC is presented by the player. Then, the video data for the FP_PGC continued by the pre-command is implemented (operation 356). Thereafter, a post-command of the FP_PGC is implemented (operation 358). The post-command in operation 354 is a navigation command that is executed after the FP-PGC is presented by the player. Then, a next link (Next_Link) instruction following the post-command starts the presentation of the next PGC relative to the current PGC. The Next_Link command displays the menu (operation 362). Thereafter, the movie is selected from the displayed menu (operation 364), and the title following the Next_Link is reproduced (operation 366). If the FP_PGC does not exist, the optical disk player waits for the user's next selection, e.g., reproduction start button, etc., in a stop mode.

According to the present invention as described above, by providing a quick playback function in a DVD player, it is possible to watch the main movie title only without watching unwanted advertisements or information.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A method of reproducing data from an optical disk, comprising:
    analyzing reproduction control information read from the disk and searching titles having a predetermined title reproduction type;
    calculating a running time of each title based on video title information corresponding to the titles searched; and
    reproducing the title selected on the basis of the running time calculated for each title.

2. The method of reproducing data from an optical disk according to claim 1, wherein the analyzing of the reproduction control information and the searching titles comprises reading video manager information (VMGI) from the disk, searching only those titles having title types (TT_TY) in a title search pointer table (TT_SRPT) of the read VMGI which are predetermined as one sequential program chain title (One_Sequential_PGC_Title), and detecting a video title set number on the searched titles.

3. The method of reproducing data from an optical disk according to claim 1, wherein the calculating the running time of each title comprises:
    detecting the running time from a video title set (VTS) program chain information table of video title set information (VTSI) included in the corresponding title.

4. The method of reproducing data from an optical disk according to claim 1, wherein the reproducing the title comprises reproducing the title having the longest running time after comparing the running time of each title.

5. A method of reproducing data from an optical disk, comprising:
    enabling/disabling a quick video playback function in a user setup menu;
    reading video manager information from the disk;
    searching video title set information of only those titles having a title type in the read video manager information which is predetermined as a sequential program chain title set (One_Sequential_PGC_Title), and detecting the video title information corresponding to the searched titles, if the quick video playback function is enabled;
    calculating a running time of each title based on the video title set information; and
    reproducing the title having the longest running time after comparing the running time of each title.

6. An optical disk player playing a recording medium on which video reproduction information and video title information are recorded, comprising:
    a system controller searching titles having a title reproduction type which is predetermined as a sequential program chain title (One_Sequential_PGC_Title) after analyzing video reproduction information read from the recording medium, and reproducing the title having a longest running time after detecting the running time of each title based on the video title information corresponding to the searched titles.

7. A method of reproducing data from a storage medium, comprising:
    identifying a title type of each title in video manager information on the storage medium;
    calculating a running time of each title having a specified title type; and
    reproducing the title having a longest running time.

8. The method of claim 7, wherein the specified title type comprises a one sequential program chain title such that the calculating of the running time includes calculating the running time of each one sequential program chain title.

9. The method of claim 7, wherein the identifying the title type includes identifying the title type from a title search pointer table in the video manager information.

10. The method of claim 7, further comprising:
    enabling or disabling a quick playback function;
    determining whether the quick playback function is enabled; and
    reading the video manager information from the storage medium if the quick playback function is determined as enabled.

11. The method of claim 7, further comprising:
    enabling or disabling a quick playback function;
    determining whether the quick playback function is disabled; and
    if determined that the quick playback function is disabled, then:
        determining whether a first playback program chain exists, such that:
            if the first playback program chain exists, then obtaining reproduction information from the first playback program chain;
            displaying a menu from the reproduction information; and
            providing a user a movie selection from the menu; and
            if the first playback program chain does not exist, then awaiting a user command in a stop mode.

12. The method of claim 7, further comprising:
    detecting a video title set number of each specified title type;
    wherein the calculating the running time includes calculating the running time from the video title set number.

13. The method of claim 7, further comprising:
    determining whether the running time of each specified title type has been calculated; and repeating determining the running time of any title of the specified title type not having the running time calculated.

14. The method of claim 7, further comprising:

reading the video manager information from the storage medium, wherein the storage medium comprises an optical disk.

15. An optical disk player having a quick playback function of data from an optical disk, comprising:

a pickup portion reading optical signals from the optical disk;

a radio frequency amplifying section converting the optical signals to electrical signals and extracting modulated data and servo signals;

a digital signal processor demodulating the modulated data, generating compressed audio and video data, and correcting errors using error correction codes;

an audio/video decoder section decoding the compressed audio and video data and providing video and audio signals to an external display device and speakers;

a servo section stabilizing servo action; and a system controller controlling the pickup section, the radio frequency amplifying section, the digital signal processor section, the audio/video decoder section, and the servo section, wherein the system controller analyzes information read from the optical disk to identify specific title types, calculates a running time of each identified title, and compares the running time of each title to reproduce the title having the longest running time.

* * * * *